United States Patent
Mottot et al.

(10) Patent No.: US 6,444,183 B1
(45) Date of Patent: Sep. 3, 2002

(54) AGENT FOR ELIMINATING HEAVY METALS COMPRISING A PHOSPHATE COMPOUND

(75) Inventors: Yves Mottot, Puteaux; Jean-Claude Kiefer, Precy sur Oise, both of (FR)

(73) Assignee: Rhodia Chimie, Boulogne Billancourt Cedex (FR)

(*) Notice: Subject to any disclaimer, the term of this patent is extended or adjusted under 35 U.S.C. 154(b) by 0 days.

(21) Appl. No.: 09/509,513

(22) PCT Filed: Sep. 17, 1998

(86) PCT No.: PCT/FR98/01993

§ 371 (c)(1),
(2), (4) Date: May 30, 2000

(87) PCT Pub. No.: WO99/16509

PCT Pub. Date: Apr. 8, 1999

(30) Foreign Application Priority Data

Sep. 30, 1997 (FR) .............................. 97 12451

(51) Int. Cl.$^7$ .................................. B01J 8/00
(52) U.S. Cl. ................ 423/210; 588/231; 588/236
(58) Field of Search ................ 423/210; 588/231, 588/236; 502/400, 407, 411

(56) References Cited

U.S. PATENT DOCUMENTS

| 4,615,643 A | * 10/1986 | Gouvenot ............ 405/128 |
| 5,447,575 A | * 9/1995 | Crump et al. ........ 134/42 |
| RE35,115 E | * 12/1995 | Winston et al. ...... 134/42 |

* cited by examiner

Primary Examiner—Stanley S. Silverman
Assistant Examiner—Edward M. Johnson

(57) ABSTRACT

The invention concerns an agent for eliminating heavy metals contained in an aqueous effluent comprising: an alkaline metal silicate, an alkaline metal carbonate; a phosphate compound, for example a sodium orthophosphate: and optionally a carrier, in particular a clay. Said agent may further contain a sulphur compound. Said agent can constitute an agent stabilizing said metals, and can be used for eliminating or stabilizing heavy metals, in particular cadmium, nickel and lead, contained in industrial aqueous effluents.

19 Claims, No Drawings

AGENT FOR ELIMINATING HEAVY METALS COMPRISING A PHOSPHATE COMPOUND

This application is an application under 35 U.S.C. Section 371 of International Application No. PCT/FR98/01993, filed on Sep. 17, 1998.

The present invention relates to an agent for removing heavy metals contained in a medium, in particular an aqueous effluent.

Legislation in the field of heavy metal discharges to the natural environment is constantly changing. Industrial effluents, such as, for example. those originating from factories in the chemical, metallurgical, electronics and mechanical engineering industries, and aqueous liquors from the washing (or purification) of flue gases from plants for the incineration of household refuse or industrial waste, in particular of industrial effluents of the spent sulphuric acid type, are media likely to contain heavy metals. Likewise, certain soils are contaminated by the presence of such metals.

Thus, in the field of aqueous liquors for washing flue gases from plants for the incineration of household refuse, the most well known process for removing heavy metals consists of a basic precipitation carried out with lime; the settling/separation stage which follows is generally improved by the incorporation of a flocculating agent.

However, this process exhibits a number of disadvantages.

On the one hand, this type of effluent to be heated often has a very high content of inorganic salts, which can hinder the complete precipitation of the heavy metals.

On the other hand, a very large volume of sludge is generated by the precipitation with lime; this sludge, after filtration and compaction in the cake form, must currently be placed in suitable landfill sites.

Furthermore, the sludge composition obtained can be difficult to stabilize (or immobilize) by current techniques. Now, future regulations relating to the storage of final special waste make it necessary to stabilize (or immobilize) the cake before it can be allowed onto the storage site, in order to very substantially reduce the leaching of this type of waste.

The aim of the present invention is in particular to provide a means which makes possible an efficient removal (or scrubbing) of heavy metals, in particular cadmium, nickel and lead, as well as, in some cases, mercury, and which does not exhibit the abovementioned disadvantages.

To this end, the present invention provides a novel agent for removing (or scrubbing) heavy metals present in a medium, the said agent being a mixed product comprising at least one alkali metal silicate, at least one alkali metal carbonate, at least one compound of the phosphate type and, optionally, at. least one carrier, in particular a clay.

It also relates to the use of the said agent for removing heavy metals, in particular cadmium, nickel and lead, as well as, in certain cases, mercury, contained in a medium, in particular an aqueous effluent.

It also relates to an agent for stabilizing (or immobilizing) the heavy metals comprising the said agent for removing heavy metals.

The Applicant has found, surprisingly, that the use of an agent for removing heavy metals as defined above made possible very efficient removal of heavy metals from the medium containing them, in particular cadmium, nickel and lead and, when it comprises a sulphur compound, mercury, and, advantageously, an improvement in the sludge obtained/supernatant liquid settling and separation, a degree of improvement in the aptitude for stabilization of this sludge, that is to say a degree of improvement in the ability of the latter to withstand leaching, and a decrease in the residual calcium content in the precipitate with respect to what is obtained with the process with lime described above.

Thus, one of the subject-matters of the invention is an agent for removing (or taking up) heavy metals contained in a medium, characterized On that the said agent comprises:
- at least one compound consisting of an alkali metal silicate, hereinafter known as compound (A),
- at least one compound consisting of an alkali metal carbonate, hereinafter known as compound
- at least one compound of the phosphate type, hereinafter known as compound (C), and
- optionally at least one carrier.

Heavy metals is understood to mean in particular metals with a valency greater than or equal to 2, preferably equal to 2, and in particular those chosen from antimony, arsenic, bismuth, cadmium, chromium, cobalt, copper, tin, manganese, mercury, molybdenum, nickel, gold, lead, thallium, tungsten, zinc, iron or metals from the actinide family.

The heavy metals particularly targeted by the present invention are chromium, copper, iron, zinc and, to a greater degree, cadmium, nickel and lead.

Certain embodiments of the agent according to the invention are advantageously used when the medium to be treated contains, as heavy metals, at least mercury.

The heavy metals to be removed are usually in the form of ions, in particular in the form of their respective cations (for example, $Cr^{3+}$, $Cu^{2+}$, $Ni^{2+}$, $Fe^{2+}$, $Fe^{3+}$, $Cd^{2+}$, $Hg^{2+}$, $Pb^{2+}$ or $Zn^{2+}$).

It should be noted that the agent according to the invention can also prove to be effective in removing metals such as aluminium and so-called radioactive metals, such as uranium or thorium.

The medium to be treated is preferably liquid.

This medium can thus be composed of an aqueous effluent, in particular an aqueous industrial effluent (that is to say, an aqueous effluent originating from an industrial process).

This medium can be, for example, an aqueous effluent formed by the aqueous liquors from the washing (or purification) of flue gases from the incineration of waste, in particular of household refuse, industrial waste or hospital waste, by aqueous liquors from washing solid material, such as earth, containing heavy metals or by aqueous surface treatment effluents; it can be an aqueous effluent originating from a factory in the chemical, metallurgical, electronics or mechanical engineering industry.

The compound (A) is an alkali metal silicate, in particular sodium or potassium silicate.

The compound (A) is advantageously a sodium silicate. The said sodium silicate then generally exhibits an $SiO_2/Na_2O$ molar ratio of between 0.5 and 3.8, for example equal to approximately 2.

The compound (B) is an alkali metal carbonate, in particular a sodium or potassium carbonate. The compound (B) is advantageously a sodium carbonate.

The ratio by weight of the compound (B) to the compound (A) can vary within relatively broad ranges of values. Nevertheless, this compound (B)/compound (A) ratio by weight is generally between 0.5 and 3.5, preferably between 1.1 and 2.5, in particular between 1.5 and 2.0.

When it contains at least one carrier, the mixed product for removing the heavy metals from a medium according to the invention, which can be used to purify the said medium, can be regarded as a composite product formed:

of at least one active principle (or precipitation agent) composed of;

at least one compound (A) consisting of an alkali metal silicate, at least one compound (B) consisting of an alkali metal carbonate, at least one compound (C) of the phosphate type; and of at least one carrier (or substrate).

The carrier optionally contained in the agent according to the invention is preferably a clay.

The clay then contained in the agent according to the invention can be of natural or synthetic origin.

The clay thus employed in the agent according to the invention advantageously exhibits a high content by weight of $Al_2O_3$; this content is, for examples between 20 and 40%.

A clay of lamellar or phyllosilicate structure can be employed according to the invention.

It is thus possible to use a clay chosen from the group comprising kaolinites and serpentines.

The clay can also be chosen from the group comprising montmorillonites, bentonites (in particular alkaline bentonites), talc and mica.

The clay chosen preferably belongs to one of these two groups.

A clay of chlorite-type structure can optionally be employed.

The agent according to the invention generally contains, as clay, a montmorillonite or a bentonite.

The content of carrier, in particular of clay, in the agent according to the invention is usually between 5 and 90% by weight, for example between 10 and 35% by weight, with respect to the total weight of the said agent.

The presence of a compound (C) of the phosphate type in the agent according to the present invention is essential.

This compound (C) is an inorganic compound advantageously containing (or contributing) at least one phosphate functional group.

It can be chosen from alkali metal, in particular sodium or potassium, or alkaline earth metal, in particular magnesium, orthophosphates, pyrophosphates, tripolyphosphates, meetaphosphates, hypophosphates, monophosphates or diphosphates Use may in particular be made of a potassium diphosphate or pyrophosphate.

The use of magnesium orthophosphate $(Mg_3(PO_4)_2 \cdot xH_2O)$ can prove to be advantageous, in particular because of its very low solubility, which can be reflected by a residual content of phosphate in the medium, after treatment using the agent according to the invention, which is also very low.

Preferably, the compound (C) is a sodium pyrophosphate $(Na_4P_2O_7 \cdot xH_2O)$ or a sodium tripolyphosphate $(Na_5P_3O_{10} \cdot xH_2O)$ or even more preferably a sodium orthophoophate $(Na_3PO_4 \cdot xH_2O)$ The content of (C) in the agent according to the invention can be between 1 and 30% by weight; it is preferably between 5 and 20% by weight.

A particularly advantageous example of the agent according to the invention has the following composition; sodium silicate/sodium carbonate/sodium orthophosphate.

When the medium to be treated contains mercury, then, if it is desired to scrub it more efficiently, the agent according to the invention advantageously comprises, in addition, at least one sulphur compound (D).

This compound (D) can be an inorganic sulphur compound.

The agent according to the invention generally does not then contain a carrier, in particular a clay.

An inorganic sulphide, in particular a barium sulphide (BaS) or a strontium sulphide (SrS), or, preferably, an inorganic (poly)thiocarbonate, in particular an alkali metal (poly)thiocarbonate, for example potassium or sodium (poly)thiocarbonate, can be employed as inorganic sulphur compound. It is thus possible to use any salt of thiocarbonic acid, such as potassium thiocarbonate $(K_2CS_3)$.

However, the compound (D) is preferably an organic sulphur compound (or so-called organosulphur compound).

The agent according to the invention then preferably contains at least one carrier, in particular a clay.

An organothiophosphate or an organodithiophosphate, in particular an alkali metal, for example sodium, dialkyl or diaryl dithiophosphate, can be used as organic sulphur compound.

The alkali metal dialkyl or diaryl dithiophosphates which can be used correspond in particular to the following formula;

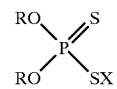

in which X is an alkali metal, for example sodium, and R is an aryl radical or, preferably, an alkyl radical, for example a methyl, ethyl, n-propyl, isopropyl, 1-methylpropyl or isobutyl radical.

A (poly)mercapto compound, in particular a mercapto, dimercapto or trimercapto compound, can preferably be employed as organic sulphur compound. This organic sulphur compound can then be a triazine (for example, an as-triazine or, preferably, an s-triazine) substituted by 1, 2 or 3 monovalent —SH radicals This organic sulphur compound is more particularly trimercapto-s-triazine, which corresponds to the following formula:

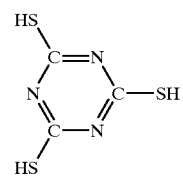

The sulphur compound (D) is preferably localized, in the carrier, at the core of the agent according to the invention.

This localization at the core of the mixed product according to the invention makes possible in particular a delayed dissolution of the sulphur compound (D) during use of the said mixed product in a liquid medium; the Applicant has found that the dissolution of the sulphur compound (D) takes place with a degree of delay with respect to the dissolutions of the constituents (A), (B) and (C).

This delayed dissolution exhibits in particular the advantage of reducing the amount of sulphur compound needed in the agent according to the invention.

The content of sulphur compound (D) in the agent according to the invention can be between 0.01 and 5%, in particular between 0.1 and 4%, by weight; it is preferably between 0.4 and 3%, for example between 0.5 and 2%, by weight.

The agents according to the invention, which contain the compounds (A), (B), (C) and optionally (but not preferably) a carrier, in particular a clay, are prepared by any appropriate process.

Compound (B), in the solid form, and compound (C), in the solid form, (and optional carrier) are added, generally with stirring, to a granulator, preferably a mixer/granulator, and an aqueous solution of the compound (A) is sprayed, in particular at a spray pressure of between 5 and 15 bar, onto the mixture (generally with stirring) in the said granulator; the granulation can be carried out using a disc granulator or a granulator of Lodige type. The aqueous solution of the compound (A), the pH of which is usually between 10 and 14, is generally heated beforehand, in particular to a temperature of between 60 and 90° C, for example between 70 and 85° C.

If the compound (A) is a sodium silicate, use is generally made of an aqueous sodium silicate solution exhibiting an $SiO_2/Na_2O$ molar ratio of between 0.5 and 3.8, for example equal to approximately 2, and a silicate concentration, expressed as $SiO_2$, of between 0.1 and 10 mol/l, for example between 0.2 and 8 mol/l.

This mixing stage (in particular spraying) is preferably followed by drying, generally in a rotary dryer, usually between 30 and 40° C., and then by further mixing with an aqueous solution of the compound (A), which mixing advantageously consists in spraying, under conditions such as are described above, the said solution onto the product resulting from the latter drying, reintroduced beforehand into a granulator (for example the one used previously), preferably a mixer/granulator.

An intermediate sieving stage after the first drying and/or a final sieving stage can be employed depending on the desired particle size.

In order to prepare an agent according to the invention additionally comprising a sulphur compound (D), use is made of any appropriate process preferably making it possible to introduce the sulphur compound at the core of the said agent. A particularly preferred process when it is then desired to prepare an agent containing a carrier, such as a clay, will be described hereinbelow.

The sulphur compound (D) is first incorporated at the core of the carrier.

For this, an aqueous solution of the sulphur compound (D) is added, generally with agitation, to a carrier, in particular a clay, introduced beforehand into a granulator, preferably a mixer/granulator. The granulation can be carried out using a disc granulator or a granulator of Lodige type.

The granulation is subsequently completed by fluid bed drying, preferably at a temperature of between 40 and 100° C., generally at a value kept constant for a certain period of time after a temperature rise. This temperature can be between 40 and 70° C., for example between 45 and 55° C. It can also be between 70 and 100° C., in particular between 85 and 95° C.

The delayed dissolution of the sulphur compound (D) during use of the agent according to the invention in a liquid medium is also due, in general, to this heat treatment. The temperature of the heat treatment can constitute a means of controlling the kinetics of dissolution of the sulphur compound (D).

The dried product obtained, in the form of granules, can subsequently be milled (in order in particular to achieve decaking of the said granules) and, optionally, sieved (with, for example, recovery solely of the fraction of the granules with a size of less than 400 μm. indeed than 200 μm).

Following this incorporation of the sulphur compound (D) at the core of the carrier, the preparation of the agent according to the invention can be continued as described, carrier being replaced, in the corresponding preceding account, by carrier+compound (D).

The agent according to the invention is A usually provided in the form of granules (cogranules) or of a powder, the size of the grains of which is preferably between 0.1 and 2.0 mm, in particular between 0.2 and 1.6 mm.

Nevertheless, it can be provided in a liquid form, after having been suspended in water; no carrier is then generally present in the composition of the agent.

Generally, the agent according to the invention exhibits a content by weight of free water (or moisture) of between 10 and 30%, preferably between 15 and 20%. This water content can be determined by measuring the loss in mass by calcining at 350° C. for 6 hours.

The use of at least one agent according to the invention to remove heavy metals from a medium containing them, in particular from a liquid effluent (or solution), in particular from an aqueous effluent (or solution), can be carried out in the following way.

The agent according to the invention is introduced with stirring into the liquid effluent to be treated. The final pH of the suspension containing the said agent which has been added thereto is preferably between 7 and 11 or adjusted to a value of between 7 and 11 by prior addition of a base or of an acid; the said pH can be in particular (adjusted) to about 9. The final pH depends on the amount of agent according to the invention introduced into the liquid effluent to be treated and on the starting pH of the said effluent. Stirring is continued, for example for 5 to 60 minutes. The suspension can subsequently be allowed to stand (settle) at ambient temperature for a certain period of time, generally between 0.5 and 24 hours, in particular between 0.5 and 6 hours. The settling time can be reduced if use is made of rapid settling methods known to a person skilled in the art. The precipitate formed, that is to say the agent according to the invention laden with heavy metals, in particular with cadmium nickel and lead, is then separated by settling, filtering and/or centrifuging the suspension.

The medium to be treated, in particular when it consists of a liquid effluent (in particular an aqueous effluent (a solution)), generally contains 0.5 to 6000 mg/l, for example 1 to 1000 mg/l, in particular 2 to 300 mg/l, of heavy metals.

The amount of agent according to the invention added to the medium to be treated is such that the $(SiO_2+CO_3^{2-})/$(cations present in the medium to be treated) molar ratio is generally between 0.7 and 2.5, for example between 1.0 and 2.2, in particular between 1.1 and 1.9. Cations present in the medium to be treated is understood here to mean heavy metal cations and $Ca^{2+}$ cations.

The use of the agents according to the invention advantageously makes possible very efficient removal of heavy metals, in particular cadmium, nickel and lead, indeed even mercury for certain embodiments of the invention, in particular in a fairly broad range of pH values, generally between 7 and 11.

Furthermore, it is found that, after separation, the precipitate formed, that is to say the agent according to the invention laden with heavy metals, preferably exhibits a satisfactory aptitude for stabilization (or immobilization). Its behaviour with respect to leaching is very acceptable: this is because it can be leached only to a very slight extent, that is to say that it releases virtually no or very few heavy metal cations which it contains when it is in the presence of water; the amounts of heavy metal chemical components in leachates obtained from leaching tests carried out conventionally are relatively low.

Thus, another subject-matter of the invention consists of an agent for stabilizing (or immobilizing) heavy metals contained in a medium, characterized in that it comprises at least one agent as described above.

If the presence of a carrier in the agent according to the invention generally makes possible a localized precipitation around the said carrier, it also makes it possible, in particular in the case of clay, to promote, surprisingly, in the case where the agent according to the invention comprises a compound of the carbonate type, the settling, in particular to increase the rate of settling. Likewise, it can also make it possible to decrease the low contents of heavy metals in the leachates such as mentioned above. It is particularly advantageous when the agent is used especially for finishing, that is to say for removing the final traces of heavy metals.

The following examples illustrate the invention without, however, limiting the scope thereof.

EXAMPLE 1

4.7 kg of $Na_2CO_3$ and 0.8 kg of sodium orthophosphate ($Na_3PO_4 \cdot 12H_2O$) are introduced into a Lodige mixer/granulator with a capacity of 20 litres; the mixture is homogenized at 160 revolutions/min (rotational speed of the blades) for 20 minutes.

4.0 kg of a sodium silicate solution, heated beforehand to 75° C., with an $SiO_2/Na_2O$ molar ratio equal to 2 and with a silicate concentration, expressed as $SiO_2$, of 30.6% by weight, are subsequently sprayed, at a spray pressure of 12 bar and at a throughput of 13.5 l/h, onto the mixture in the mixer/granulator operating at the same speed (160 revolutions/min).

Granules are recovered which are then dried for 45 minutes in a rotary dryer using hot air, so that the temperature of the granules does not exceed 50° C.

The granules are subsequently sieved (using a 1.6 mm sieve); the rejected material is milled using a Forplex pin mill equipped with a 3 mm screen. The sieved granules and the milled granules are reintroduced into the mixer/granulator.

Finally, 1.8 kg of a sodium silicate solution as defined above (i.e., in the two sprayings combined, 2.6 kg of dry sodium silicate) are sprayed onto these granules in the restarted mixer/granulator.

The granules obtained are then dried as indicated above.

Subsequently, by sieving, the granules having a size of between 0.2 and 1.6 mm are recovered; their mean size is 0.7 mm.

The product obtained (P1), composed of the said granules, comprises approximately 32% of sodium silicate, 58% of sodium carbonate and 10% of sodium orthophosphate.

EXAMPLE 2

An aqueous effluent of aqueous liquors from the washing of flue gases from the incineration of household refuse is reconstituted as follows.

The following amounts are dissolved in 5 litres of aqueous sodium chloride solution containing 200 g of NaCl:

| | | | |
|---|---|---|---|
| $Na_2SO_4$: | 7.40 g | $CuCl_2$: | 0.07 g |
| $CaCl_2 \cdot 2H_2O$: | 18.40 g | $CdCl_2$: | 0.04 g |
| $AlCl_3 \cdot 6H_2O$: | 2.23 g | $NiCl_2$: | 0.10 g |
| $FeCl_3 \cdot 6H_2O$: | 1.22 g | $PbCl_2$: | 0.07 g |
| $ZnCl_2$: | 1.57 g | | |

The pH of this effluent is adjusted to a value of 2 by addition of hydrochloric acid.

The said effluent exhibits the following contents, expressed in mg/l:

| | | | |
|---|---|---|---|
| $Ca^{2+}$: | 1000 | $Cu^{2+}$: | 5 |
| $Al^{3+}$: | 50 | $Cd^{2+}$: | 5 |
| $Fe^{2+} + Fe^{3+}$: | 50 | $Ni^{2+}$: | 5 |
| $Zn^{2+}$: | 150 | $Pb^{2+}$: | 10 |

Two tests on the removal of the heavy metals contained in this effluent are carried out with:

the product P1 according to the invention, prepared in Example 1, a product P2 not in accordance with the invention which is distinguished from P1 by the absence of sodium orthophosphate (composition by weight of P2: 35.5% of sodium silicate and 64.5% of sodium carbonate).

These two products are employed (separately) for a final neutralization pH of 9.

The amounts of product P1 and P2 to be used per 500 ml of the said effluent are as follows:

P1: 4.5 g for a final pH of 9,

P2: 4.2 g for a final pH of 9.

For each test, the amount of product P1 (or P2) indicated above is introduced instantaneously, with stirring, into 500 ml of the said effluent, and stirring is maintained for 30 minutes.

The suspension obtained is subsequently left standing at ambient temperature for 4 hours.

It is then centrifuged at 3000 revolutions/min for 10 minutes.

The following concentrations (Table 1) of various components of the purified effluent (that is to say, the supernatant part) are measured by any appropriate method (in particular ICP/MS (plasma emission spectroscopy with mass detection (equipment used: Elan 5000, Perkin-Elmer)) for the elements Cd and Pb and ICP/OES (plasma emission spectroscopy with optical detection (equipment used: Sopra DPS 1500)) for the elements Ca, Al, Fe, Zn, Cu and Ni).

TABLE 1

| Component | Starting content (mg/l) | Content after treatment with P1 (mg/l) | Content after treatment with P2 (mg/l) |
|---|---|---|---|
| $Ca^{2+}$ | 1000 | 5 | 25 |
| $Al^{3+}$ | 50 | <0.2 | <0.2 |
| $Fe^{2+} + Fe^{3+}$ | 50 | <0.1 | <0.1 |
| $Zn^{2+}$ | 150 | <0.3 | <0.3 |
| $Cu^{2+}$ | 5 | <0.1 | <0.1 |
| $Cd^{2+}$ | 5 | <0.1 | 0.4 |
| $Ni^{2+}$ | 5 | <0.1 | 0.4 |
| $Pb^{2+}$ | 10 | <0.05 | 0.11 |

The results indicated in the above table show that the agent according to the invention is very effective; they illustrate in particular its better effectiveness with respect to cadmium, nickel and lead in comparison with a product devoid of compound of the phosphate type.

The very substantial decrease in the level of calcium using the agent according to the invention should also be noted. In the case of the treatment of an incinerator effluent, this can be of advantage when the said agent is used upstream of a stage of concentration or of purification of sodium chloride by a process using a resin or a membrane.

What is claimed is:

1. A process for removing heavy metals contained in a medium, comprising the steps of adding to said medium an agent comprising:

at least one compound (A) which is an alkali metal silicate, at least one compound (B) which is an alkali metal carbonate, and at least one compound (C) which is a phosphate, wherein said heavy metals are cadmium, chromium, copper, nickel, lead, zinc or iron, and wherein said medium is an aqueous effluent formed by aqueous liquors from purification of flue gases coming from waste incineration.

2. A process according to claim 1, wherein said medium contains at least cadmium, nickel and lead.

3. A process according to claim 1, wherein said medium contains at least mercury.

4. A process according to claim 1, wherein said compound (A) is a sodium or potassium silicate.

5. A process according to claim 1, wherein said compound (B) is a sodium carbonate.

6. A process according to claim 1, wherein said compound (A) is a sodium silicate and said compound (B) is a sodium carbonate.

7. A process according to claim 1, wherein compound (A) and compound (B) are present in a compound (B)/compound (A) ratio by weight of between 0.5 and 3.5.

8. A process according to claim 7, wherein the ratio by weight is between 1.1 and 2.5.

9. A process according to claim 1, wherein said compound (C) is an alkali metal orthophosphate, alkaline earth metal orthophosphate, pyrophosphate, tripolyphosphate, metaphosphate, hypophosphate, monophosphate, or a diphosphate.

10. A process according to claim 1, wherein said compound (C) is a sodium orthophosphate, magnesium orthophosphate, sodium pyrophosphate, potassium pyrophosphate, or a sodium tripolyphosphate.

11. A process according to claim 10, wherein said compound (C) is a sodium orthophosphate.

12. A process according to claim 1, wherein it exhibits a content of compound (C) of between 1 and 30% by weight.

13. A process according to claim 12, wherein the content of compound (C) is between 5 and 20% by weight.

14. A process according to claim 1, further comprising at least one carrier.

15. A process according to claim 14, wherein said carrier is clay.

16. A process according to claim 14, wherein it exhibits a content of carrier of between 5 and 90% by weight.

17. A process according to claim 16, wherein the content of carrier, is between 10 and 35% by weight.

18. A process according to claim 1, further comprising at least one sulphur compound (D).

19. A process according to claim 18, wherein the content of sulphur compound (D) is between 0.01 and 5% by weight.

* * * * *